(12) United States Patent
Niwa et al.

(10) Patent No.: US 7,113,353 B2
(45) Date of Patent: Sep. 26, 2006

(54) METHOD OF FIXING COLOR WHEEL TO MOTOR

(75) Inventors: Shinichi Niwa, Iwata-gun (JP); Toshiaki Asakawa, Iwata-gun (JP); Shigeyuki Adachi, Iwata-gun (JP); Kuniyuki Takao, Iwata-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 165 days.

(21) Appl. No.: 10/981,655

(22) Filed: Nov. 5, 2004

(65) Prior Publication Data

US 2006/0044526 A1 Mar. 2, 2006

(30) Foreign Application Priority Data

Sep. 2, 2004 (JP) ............................. 2004-255865

(51) Int. Cl.
*G02B 5/22* (2006.01)

(52) U.S. Cl. ...................... 359/891; 359/885; 359/889; 359/892; 348/743; 356/418; 353/84

(58) Field of Classification Search ................ 359/891, 359/892, 885, 889; 348/743; 356/418; 353/84; 362/293
See application file for complete search history.

(56) References Cited

U.S. PATENT DOCUMENTS

| | | | |
|---|---|---|---|
| 4,800,474 A | 1/1989 | Bornhorst | |
| 5,257,332 A | 10/1993 | Pimpinella | |
| 5,868,482 A | 2/1999 | Edlinger et al. | |
| 6,011,662 A | 1/2000 | Evans | |
| 6,024,453 A | 2/2000 | Edlinger et al. | |
| 6,574,046 B1 | 6/2003 | Shioya | |
| 6,604,830 B1 * | 8/2003 | Chiu et al. | ...................... 353/84 |
| 6,702,446 B1 | 3/2004 | De Vaan et al. | |
| 6,715,887 B1 | 4/2004 | Chang | |
| 6,813,087 B1 | 11/2004 | Davis | |
| 6,970,309 B1 * | 11/2005 | Chang et al. | ................ 359/892 |
| 2002/0005914 A1 | 1/2002 | Tew | |
| 2002/0105729 A1 | 8/2002 | Richards et al. | |
| 2003/0142241 A1 | 7/2003 | Allen et al. | |
| 2004/0095767 A1 * | 5/2004 | Ohmae et al. | ............... 362/293 |
| 2004/0165298 A1 * | 8/2004 | Chen et al. | ................ 359/892 |
| 2005/0018145 A1 | 1/2005 | Kwon et al. | |
| 2005/0128614 A1 * | 6/2005 | Kao et al. | .................... 359/892 |

FOREIGN PATENT DOCUMENTS

| | | |
|---|---|---|
| JP | A 03-122903 | 5/1991 |
| JP | A 05-090391 | 4/1993 |
| JP | A 06-347639 | 12/1994 |
| JP | 10-48542 A | 2/1998 |
| JP | A 11-115711 | 4/1999 |
| JP | A 11-222664 | 8/1999 |
| JP | A 2000-239830 | 9/2000 |
| JP | A 2001-073136 | 3/2001 |
| JP | A 2003-050309 | 2/2003 |
| JP | A 2003-057424 | 2/2003 |
| JP | 2004-101827 A | 4/2004 |
| WO | WO 94/25796 | 11/1994 |

(Continued)

* cited by examiner

*Primary Examiner*—Leonidas Boutsikaris
(74) *Attorney, Agent, or Firm*—Oliff & Berridge, PLC

(57) ABSTRACT

A color wheel is attached to a hub of a motor before the hub is built in the motor. In this process, portions of the hub which do not impact the rotation accuracy of the motor are held by appropriate clamping means and attaching means so that excessive stress and heat are not applied to bearings of the motor. Then, the hub with the color wheel attached thereto is assembled to the rest of components of the motor.

11 Claims, 6 Drawing Sheets

METHOD OF FIXING COLOR WHEEL TO MOTOR

BACKGROUND OF THE INVENTION

1. Field of the Invention

The present invention relates to a method of fixing, to a motor, a color wheel suitable for use as a filter element in a color wheel assembly as a time-share light dispersing device.

2. Description of the Related Art

Color composition in a projection-type image display apparatus has conventionally been accomplished commonly by a method, such as: a single-panel method, in which one light valve element adapted to control light amount per pixel thereby creating an image is used to disperse each pixel into R (red), G (green), and B (blue) lights; and a three-panel method, in which three light valve elements dedicated to R, G and B lights, respectively, are used to produce R, G and B images in parallel, and then the three images thus produced are composed. Recently, as a light valve element capable of fast switching, such as a ferroelectric liquid crystal display element or a digital micro-mirror device, is increasingly coming into practical use, a time-sharing single-panel method is widely used. In the time-sharing single-panel method, R, G and B lights are caused to sequentially impinge on one light valve element, the light valve element is driven in synchronization with switching-over of the R, G and B lights thereby producing R, G and B images in a time-series manner, and the images thus produced are projected onto a screen, or the like. Here, color composition of the images is accomplished by a viewer due to an afterimage effect occurring at a sense of vision. In the time-sharing single-panel method, reduction in both dimension and weight of the apparatus, which is a feature of a single-panel method, can be achieved by employing a relatively simple optical system, and therefore the time-sharing single-panel method is favorable for realizing inexpensive fabrication of a projection-type image display apparatus. In such an image display apparatus, a color wheel is preferably used as a filter element of a time-share light dispersing device to sequentially disperse light emitted from a white light source into R, G and B lights having respective wavelength bands in a time-sharing manner.

FIGS. 6A and 6B are respectively top plan and side views of a conventional and typical color wheel assembly 200 as a time-share light dispersing device including such a color wheel. Referring to FIG. 6B, the color wheel assembly 200 comprises a color wheel 100, and a driving motor 106 including a motor hub 105. The color wheel 150 is a tricolor color wheel composed of a disk-like substrate 101 which is made of a light-transmitting material, for example, optical glass, and three pie-shaped (sectorial) filters 102, 103 and 104 which are formed on a surface of the substrate 101, and which transmit exclusively, for example, R, G and B lights, respectively. The color wheel 100 thus structured is fixedly attached to the motor hub 105 coaxially therewith. The color wheel assembly 200 operates such that the color wheel 100 is spun by the driving motor 106 so that white light S impinges sequentially on the filters (R, G and B) 102, 103 and 104 whereby the white light S is sequentially dispersed into R, G and B lights.

FIGS. 7 and 8 show respectively top plan and exploded side sectional view of a segment-type color wheel 160 comprising a plurality (four in FIG. 7) of sectorial color filter segments (hereinafter referred to simply as segments as appropriate) 112, 114, 116 and 118 which are separately prepared and are fixed in position by means of a support member 120 and a clamp member 122 so as to form a disk.

Specifically, as shown in FIG. 7, respective inner circumferences 112a, 114a, 116a and 118a of the segments 112, 114, 116 and 118 are fitted to an outer circumference of a smaller cylinder portion 120a of the support member 120 whereby the segments 112, 114, 116 and 118 are duly set in position in the radial direction of the color wheel 160, and respective surfaces of the segments 112, 114, 116 and 118 toward the inner circumferences 112a, 114a, 116a and 118a are fitted to an annular seat portion 120b of the support member 120 whereby the segments 112, 114, 116 and 118 are duly set in position in the thickness direction of the color wheel 160. Then, a smaller cylinder portion 122a of the clamp member 122 is engagingly inserted into a hollow 120c of the support member 120 so that an annular seat portion 122b of the clamp member 122 and the aforementioned annular seat portion 120b of the support member 120 sandwich and clamp the inner circumferential portions of the 112, 114, 116 and 118. And, when the support member 120 and the clamp member 122 are bonded or screwed together, the segments 112, 114, 116 and 118 are fixed in position. The color wheel 160 thus structured is fixedly attached to a motor (such as the driving motor 106 as shown in FIG. 6B) via a hub (such as the hub 105 as shown in FIGS. 6A and 6B) such that the hub is inserted in a hollow 122c of the clamp member 122 (refer to, for example, Japanese Patent Applications Laid-Open Nos. 2004-101827 ([0010], and FIG. 6 therein) and H10-48542 (claim 1, and FIG. 2 therein).

FIG. 9 is a schematic sectional view of a motor 106 as one example of the motor shown in FIG. 6B. The motor 106 is a rotary shaft type motor, in which a hub 105 is fixed to a rotary shaft 107 which is rotatably held by bearings 108 attached to a housing 109. The hub 105 includes a cylinder portion 105a, and a rotor magnet 110 is fixedly attached to an inner circumferential surface of the cylinder portion 105a. A stator 111 is fixed to the housing 109, and a coil 111a is attached to the stator 111.

Conventionally, the color wheel 160 shown in FIGS. 7 and 8 is adhesively attached to the hub 105 after the hub 105 is assembled to the rest of components including the bearings 108 to complete the motor 106. Since an adequate pressing force is applied for sufficient bonding strength, and also an adjusting work is performed for positional accuracy in the process of attaching the color wheel 160 to the hub 105 already built in the motor 106, excessive stress and heat are given to the bearings 108 which are precision components. This degrades accidentally the bearings 108, and it may happen that the motor 106 generates noises when rotating, and that the center of the motor 106 is shifted. Such problems can happen not only with a segment-type color wheel such as the aforementioned color wheel 160 but also with s monolithic-type color wheel which is structured such that color filters are formed on one disk-like substrate, and which does not use a support member.

SUMMARY OF THE INVENTION

The present invention has been made in light of the problems described above, and it is an object of the present invention to provide a method of fixing a color wheel to a motor, in which attaching strength is increased and positional accuracy is improved while ensuring motor accuracy after the color wheel is attached to the motor.

In order to achieve the object described above, according to one aspect of the present invention, there is provided a method of fixing, to a motor, a color wheel including a plurality of filters which either selectively transmit or selectively reflect lights having respective wavelengths different from one another. In the method, a color wheel is fixed to a hub of a motor, and then the hub with the color wheel is assembled to rest of components of the motor. Since the hub is assembled to the rest of components of the motor including bearings after the color wheel is attached to the hub, excessive stress and heat that are used for fixedly attaching the color wheel to the hub are not given to the bearings of the motor, thus ensuring motor accuracy required.

In the one aspect of the present invention, the plurality of filters may be constituted respectively by a plurality of color filter segments which are arranged so as to form a disk-like configuration, and which are fixed directly to the hub. Thus, the method of the present invention can be applied to a segment-type color wheel, ensuring required motor accuracy in the same way.

In the one aspect of the present invention, protrusions may be provided at the hub while either at least one through-hole or at least one cavity is formed at each of the color filter segments, and the protrusions of the hub may be engaged with either the through-holes or the cavities of the color filter segments. With this structure, the color filter segments can be fixedly positioned with respect to the hub in the radial direction so that the color segments are surely prevented from getting scattered off from the hub due to centrifugal force when the color wheel spins at high speed, while required motor accuracy is ensured. And, this can happen without using any additional fixing components.

In the one aspect of the present invention, the plurality of filters may be constituted respectively by a plurality of color filter segments which are fitted to a support member so as to form a disk-like configuration, and which are fixed to the hub. This structure also allows the hub to be set in the motor after the color wheel is attached to the hub, and ensures motor accuracy required.

In the one aspect of the present invention, protrusions may be provided at an outer peripheral portion of the support member while either at least one through-holes or at last one cavity is formed at each of the color filter segments, and the protrusions of the support member may be engaged with either the through-holes or the cavities of the color filter segments. This is another structure for enabling the color filter segments to be fixedly positioned with respect to the hub in the radial direction so that the color segments are surely prevented from getting scattered off from the hub due to centrifugal force when the color wheel spins at high speed, while ensuring motor accuracy required.

In the one aspect of the present invention, the plurality of color filter segments may be fixed to the hub by adhesive and/or a clamp. Thus, the color filter segments can be fixed to the hub by a preferred method.

In the one aspect of the present invention, the plurality of filters may be formed on a disk-like substrate. Thus, the method of the present invention can be applied to a monolithic-type color wheel, ensuring required motor accuracy in the same way.

In the one aspect of the present invention, the disk-like substrate may be fixed to the hub by adhesive and/or a clamp. Thus, the disk-like substrate can be fixed to the hub by a preferred method.

In the one aspect of the present invention, the process of fixing the color wheel to the hub may take place concurrently with a process of fixing a rotor magnet to the hub. Thus, both of the adhesively fixing processes can be conducted at one time, thereby reducing the number of manufacturing processes.

BRIEF DESCRIPTION OF THE DRAWINGS

The invention will become more fully understood from the following detailed description, taken in conjunction with the accompanying drawings, in which.

DETAILED DESCRIPTION OF THE PREFERRED EMBODIMENTS

Preferred embodiments of the present invention will hereinafter be described with reference to the accompanying drawings.

A method of attaching a color wheel to a motor according to a first embodiment of the present invention will be described with reference to FIGS. 1A, 1B and 1C.

Figure 1A:
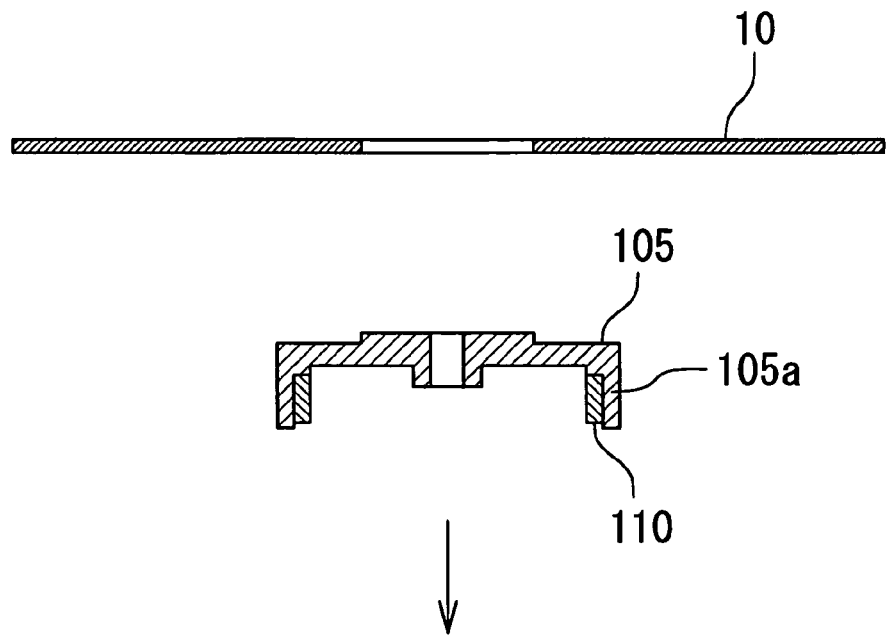
FIGS. 1A, 1B and 1C are explanatory views of a method of fixing a color wheel to a motor, according to a first embodiment of the present invention.
Figure 1B:
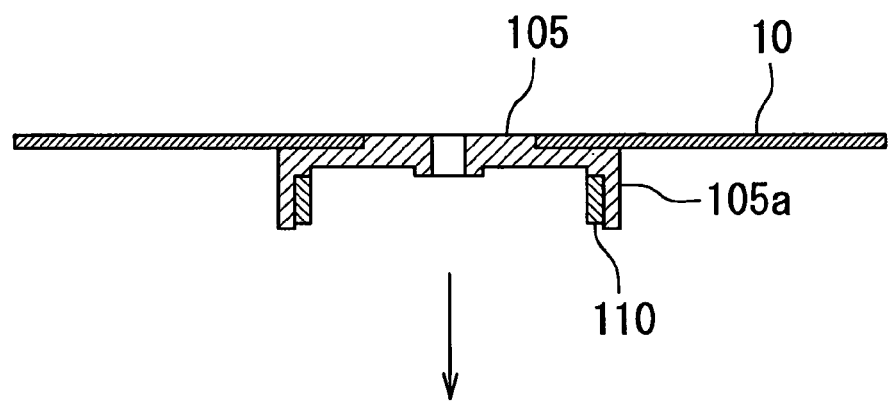
Figure 1C:
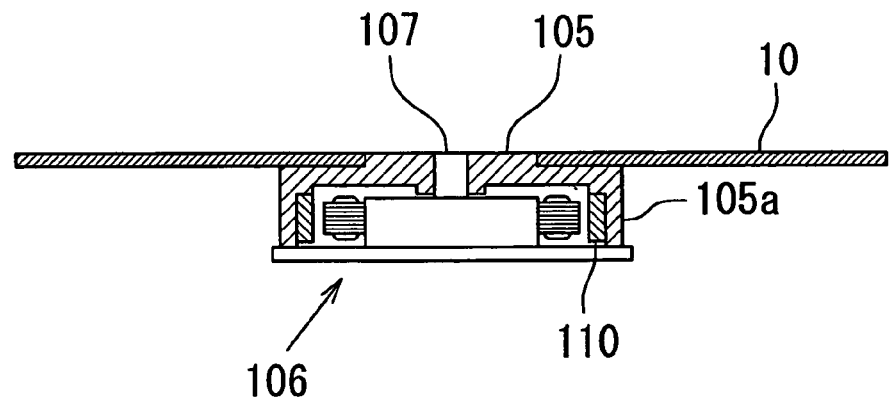

FIG. 1A shows s color wheel 10, and a motor hub 105 constituting a motor 106 (refer to FIG. 1C). The hub 105 includes a cylinder portion 105a, and a rotor magnet 110 is attached to an inner circumferential surface of the cylinder portion 105a. Referring to FIG. 1B, the color wheel 10 is attached to the hub 105. And then, the hub 105 with the color wheel 10 attached thereto as shown in FIG. 1B is assembled to the rest of components of the motor 106 as shown in FIG. 1C. The color wheel 10 is attached to the hub 105 while regions of the hub 105 which do not affect the rotation accuracy of the hub 105 are held by an appropriate clamping means. The attachment process can be accomplished by an adhesive method and/or a mechanical method. The mechanical method includes, for example, a disk clamp conventionally employed in a hard disk drive, or a clamp plate adapted to cover a central area of the color wheel 10 and screwed to the hub 105. In the method shown by FIGS. 1A to 1C, the color wheel 10 is a monolithic type and adhesively fixed to the hub 105. In this connection, FIG. 1A shows that the rotor magnet 110 is pre-attached to the hub 105 before the color wheel 10 is attached to the hub 105, but alternatively the color wheel 10 and the rotor magnet 110 may be attached to the hub 105 concurrently. Thus, the processes of attaching a color wheel and a rotor magnet to a motor hub, which must conventionally be separated, can now be accomplished at one time.

In the case of attaching a segment-type color wheel (for example, a color wheel 11 shown in FIG. 3), illustrative methods for which will hereinafter be discussed, the color wheel is first attached to the hub 105, and then the hub 105 with the color wheel attached thereto is assembled to the rest of components of the motor 106 in the same way as in the case of the monolithic-type color wheel 10 described above.

Figure 2:
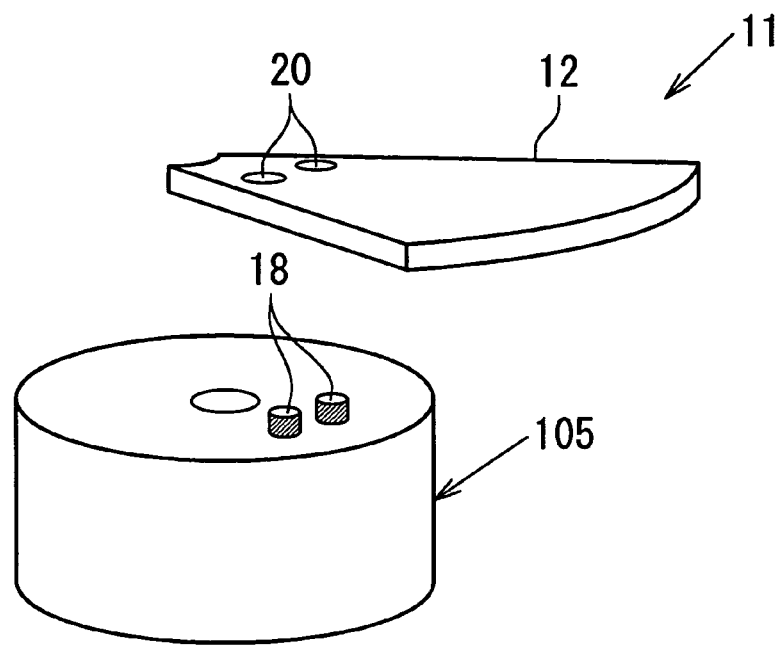
FIG. 2 is a perspective view of a part of processes in a method of fixing a segment-type color wheel to a motor, according to a second embodiment of the present invention.
Figure 3:
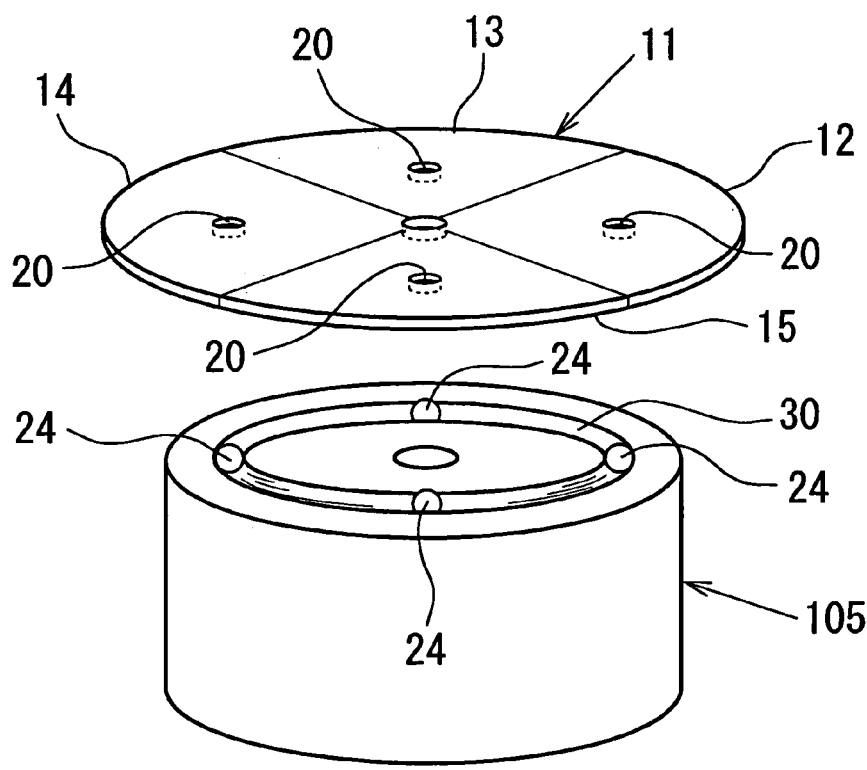
FIG. 3 is a perspective view of a modification of the method according to the second embodiment shown in FIG. 2.

Referring to FIG. 2 relating to a second embodiment of the present invention, in the case of a segment-type color wheel, it is preferable that pins 18 are provided at the hub 105 so as to protrude therefrom, through-holes or cavities 20 (through-hoes in the figure) for receiving the pins 18 are formed at a color filter segment (hereinafter referred to simply as "segment" as appropriate) 12 of a color wheel, and that the segment 12 is adhesively attached to the hub 105 with the pins 18 of the hub 105 press-fitted into the through-holes 20 of the segment 12, or loose-fitted therein to be adhesively fixed. FIG. 2 shows only one segment 12 for convenience of explanation, but actually, as shown in FIG. 3, a plurality (four in the figure) of segments 12, 13, 14 and 15 constitute the aforementioned segment-type color wheel 11. Also, in FIG. 2, two through-holes 20 are formed at the segment 20, but one, or three or more of the through-holes (or cavities) 20 may be formed at each of the segments 12 to 15, and the pins 18 may be provided in a number corresponding to the total number of the through-holes (or cavities) 20 formed at the segments 12 to 15. The pins 18 are shaped like a simple cylinder in FIG. 2, but may alternatively be shaped like a cylinder with a chamfered or rounded top, or may be substituted by balls (refer to balls 24 in FIG. 3), such as bearing balls. The pins 18 (or the balls 24) may be fixed to the hub 105 such that the pins 18 (or the balls 24) are press-fitted into through-holes or cavities formed at the hub 105, or are loose-fitted therein to be adhesively fixed. The segments 12 to 15 are commonly made of glass, and the through-holes (or cavities) 20 may be formed at the segments 12 to 15 by general machining, ultrasonic machining, blasting, laser machining, or the like.

The segment 12 may be attached to the hub 105 in such a manner that the segment 12 is placed on the hub 105 without the pins 18 such that the through-holes 20 coincide with the through-holes or cavities formed at the hub 105, and then that the pins 18 are press-fitted into the through-holes 20 of the segment 12 and the through-holes or cavities of the hub 105, or are loose-fitted therein to be adhesively fixed.

In any manner of attaching the segment 12 to the hub 105, the pins 18 on the hub 105 are engaged with the through-holes 20 of the segment 12, whereby the segment 12 is fixedly positioned with respect to the hub 105 in the radial direction of the color wheel.

In FIG. 3 relating to a modification of the second embodiment, the pins 18 are substituted by the balls 24 as mentioned previously. An annular groove 30 for movably accepting the balls 24 is formed on a surface of the hub 105 facing the color wheel 11. With this structure, when the color wheel 11 is placed on the hub 105 for attachment, the balls 24 can move along the annular groove 30 thereby allowing the color wheel 11 to turn with respect to the hub 105 after they are set to each other. Thus, adhesive applied between the color wheel 11 and the hub 105 can be preferably spread for enhanced bonding strength.

Figure 4A:
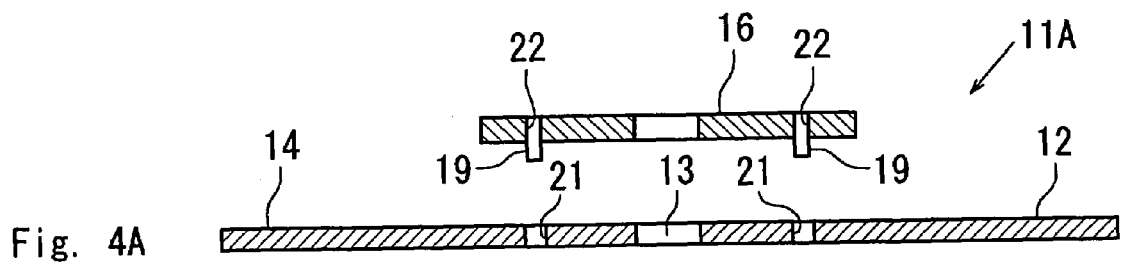
FIGS. 4A and 4B are explanatory views of a method of fixing a segment-type color wheel to a motor, according to a third embodiment of the present invention.
Figure 4B:
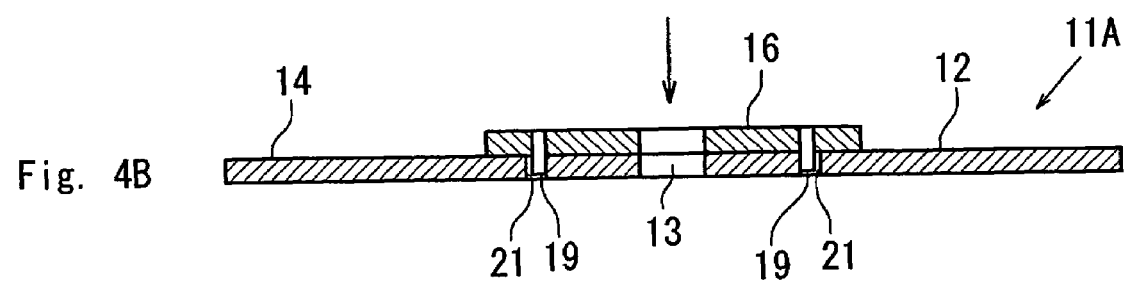

Referring to FIGS. 4A and 4B relating to a third embodiment of the present invention, segments 12 to 15 constituting a color wheel 11A are fixedly put together in place by means of a support member 16 shaped like, for example, a disk, and then the color wheel 11A thus assembled as a segment type is attached to a motor hub. More specifically, pins 19, which are fixedly set in holes 22 formed at the outer peripheral portion of the support member 16, are press-fitted into holes 21 of the segments 12 to 15, or loose-fitted therein to be adhesively fixed, and the segment-type color wheel 11A is attached to a motor hub.

Figure 5A:
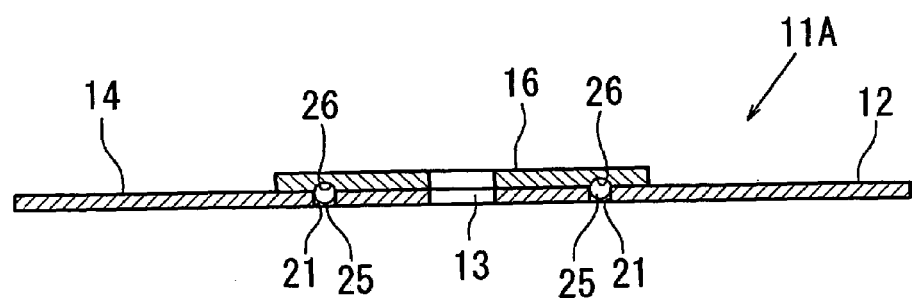
FIGS. 5A and 5B are sectional views of respective modifications of the method according to the third embodiment shown in FIGS. 4A and 4B.
Figure 5B:
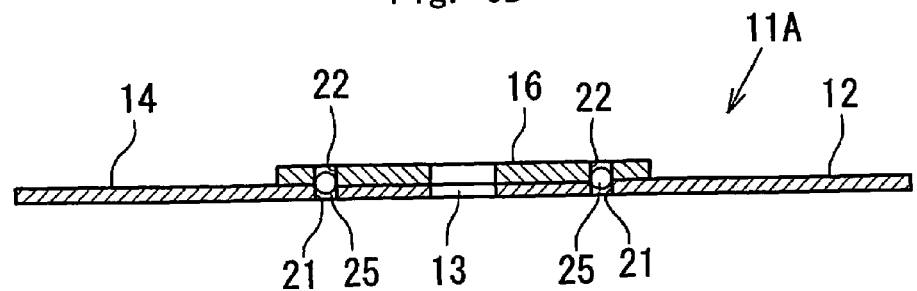
Figure 6A:
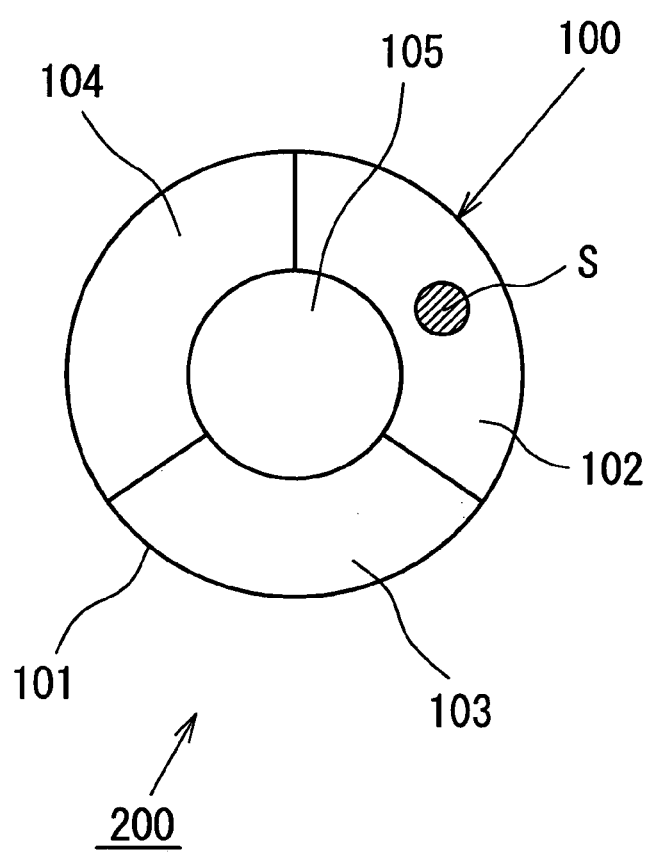
FIGS. 6A and 6B are respectively top plan view and side view of a conventional color wheel assembly.
Figure 6B:
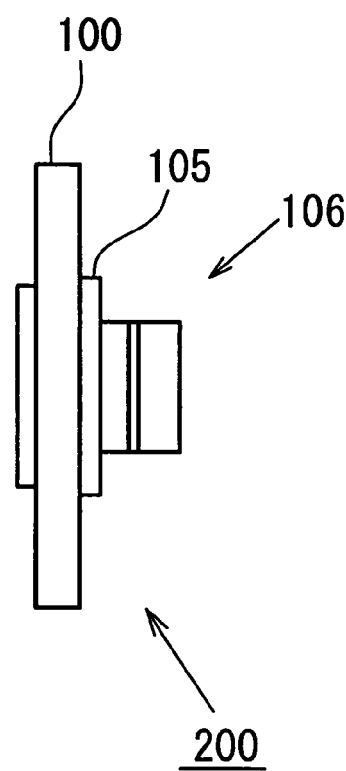
Figure 7:
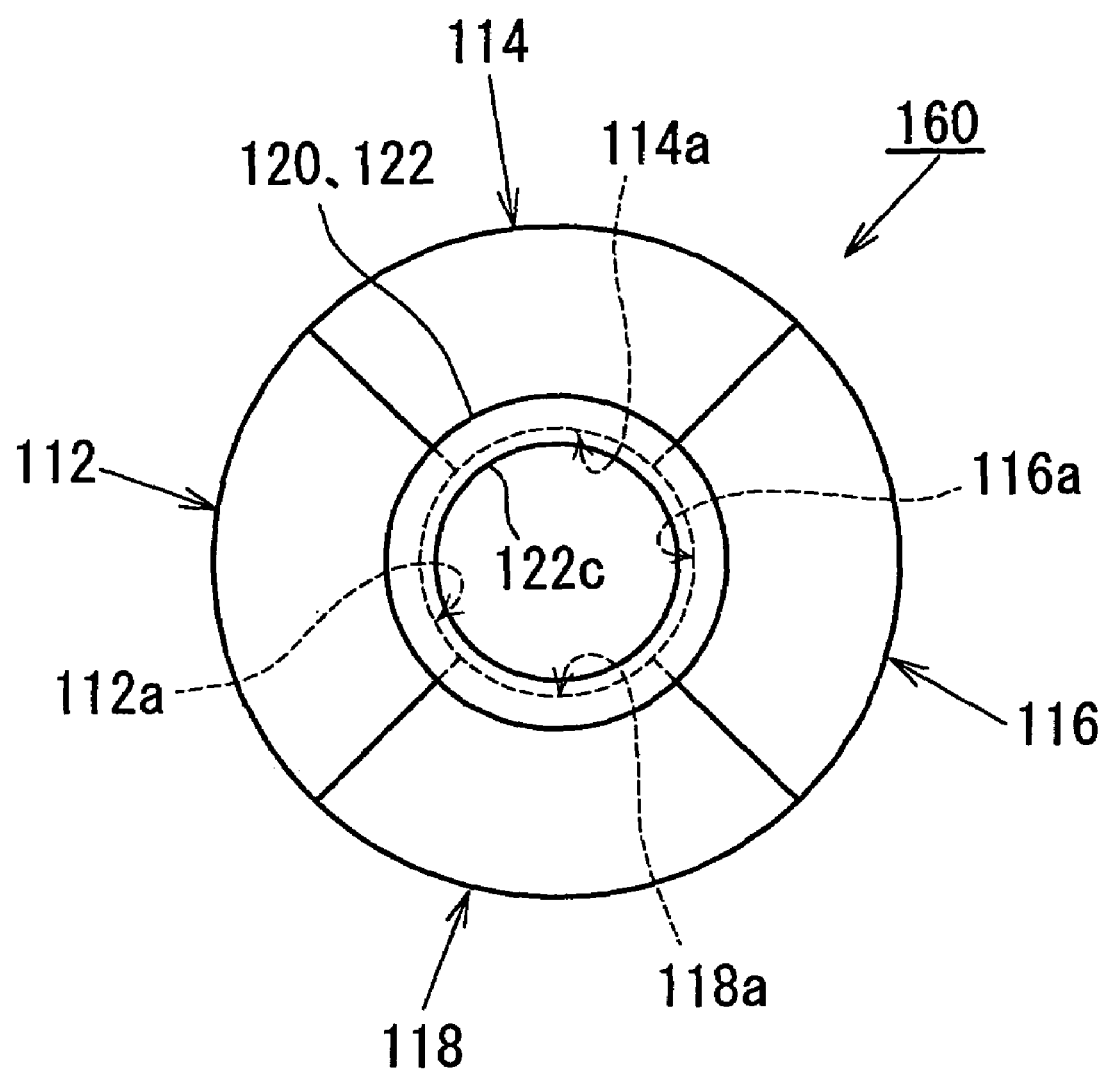
FIG. 7 is a top plan view of a conventional segment-type color wheel.
Figure 8:
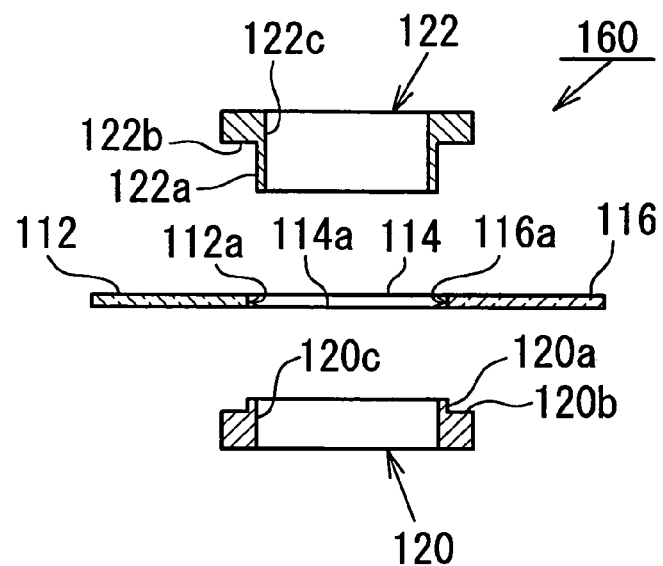
FIG. 8 is an exploded sectional view of the conventional segment-type color wheel of FIG. 7.
Figure 9:
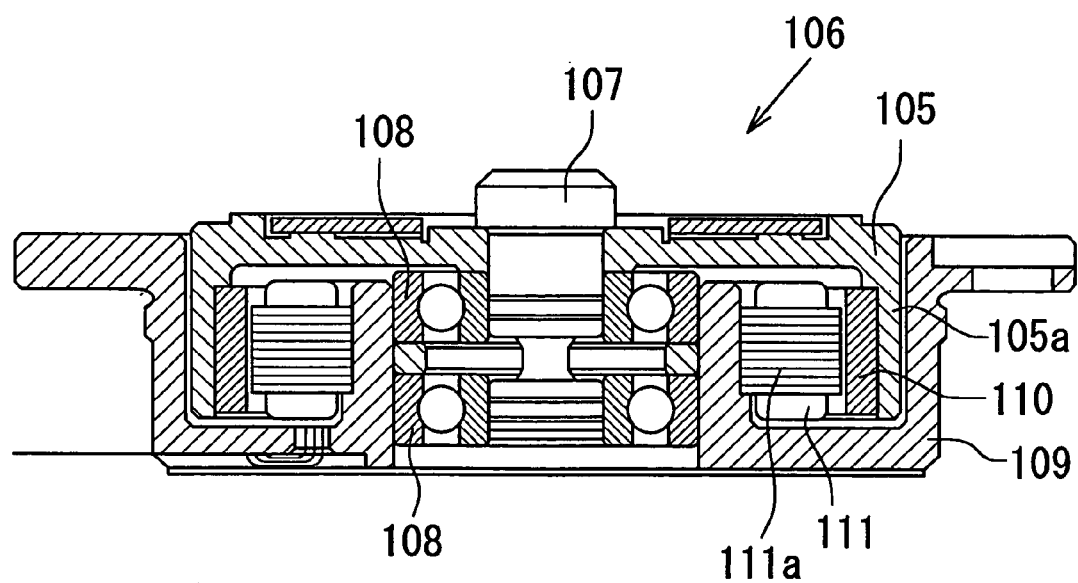
FIG. 9 is a sectional view of a motor shown in FIG. 6B.

FIGS. 5A and 5B show modifications of the third embodiment. The modifications differ from the method described above in that balls 25 are used in place of the pins 19. The difference between the two modifications is that cavities 26 are formed at a support member 16 in FIG. 5A while through-holes 22 are formed thereat in FIG. 5B.

The color wheel 11A structured according to any modifications in the third embodiment can be fixed to a motor hub adhesively and/or mechanically.

Further, the hub 105 may be formed by casting, molding or pressing so as to integrally include the pins 18. Also, the support member 16 may be formed by casting, molding or pressing so as to integrally include the pins 19.

Many different embodiments of the present invention may be constructed without departing from the spirit and scope of the present invention. It should be understood that the present invention is not limited to the specific embodiments described in this specification. For example, the motor is a rotary shaft type in the embodiments in this specification, but may alternatively be a stationary shaft type, in which bearings are disposed between a hub and a shaft fixed to a housing. Thus, the present invention is intended to cover various modifications and equivalent arrangements included within the spirit and scope of the appended claims.

What is claimed is:

1. A method of fixing, to a motor, a color wheel including a plurality of filters which either selectively transmit or selectively reflect lights having respective wavelengths different from one another, the method comprising a process of fixing a color wheel to a hub of a motor before the hub is assembled to rest of components of the motor.

2. A method according to claim 1, wherein the plurality of filters are constituted respectively by a plurality of color filter segments which are arranged so as to form a disk-like configuration, and which are fixed directly to the hub.

3. A method according to claim 2, wherein protrusions are provided at the hub while either at least one through-hole or at least one cavity is formed at each of the color filter segments, and the protrusions of the hub are engaged with either the through-holes or the cavities of the color filter segments.

4. A method according to claim 1, wherein the plurality of filters are constituted respectively by a plurality of color filter segments which are fitted to a support member so as to form a disk-like configuration, and which are fixed to the hub.

5. A method according to claim 4, wherein protrusions are provided at an outer peripheral portion of the support member while either at least one through-holes or at least one cavity is formed at each of the color filter segments, and the protrusions of the support member are engaged with either the through-holes or the cavities of the color filter segments.

6. A method according to claim 2, wherein the plurality of color filter segments are fixed to the hub by adhesive.

7. A method according to claim 2, wherein the plurality of color filter segments are fixed to the hub by a clamp.

8. A method according to claim 1, wherein the plurality of filters are formed on a disk-like substrate.

9. A method according to claim 8, wherein the disk-like substrate is fixed to the hub by adhesive.

10. A method according to claim 8, wherein the disk-like substrate is fixed to the hub by a clamp.

11. A method according to claim 1, wherein the process of fixing the color wheel to the hub takes place concurrently with a process of fixing a rotor magnet to the hub.

* * * * *